July 24, 1951     H. E. PRUITT     2,561,992
THREADING, DRILLING, AND REAMING MACHINE
Filed May 17, 1948     4 Sheets-Sheet 1
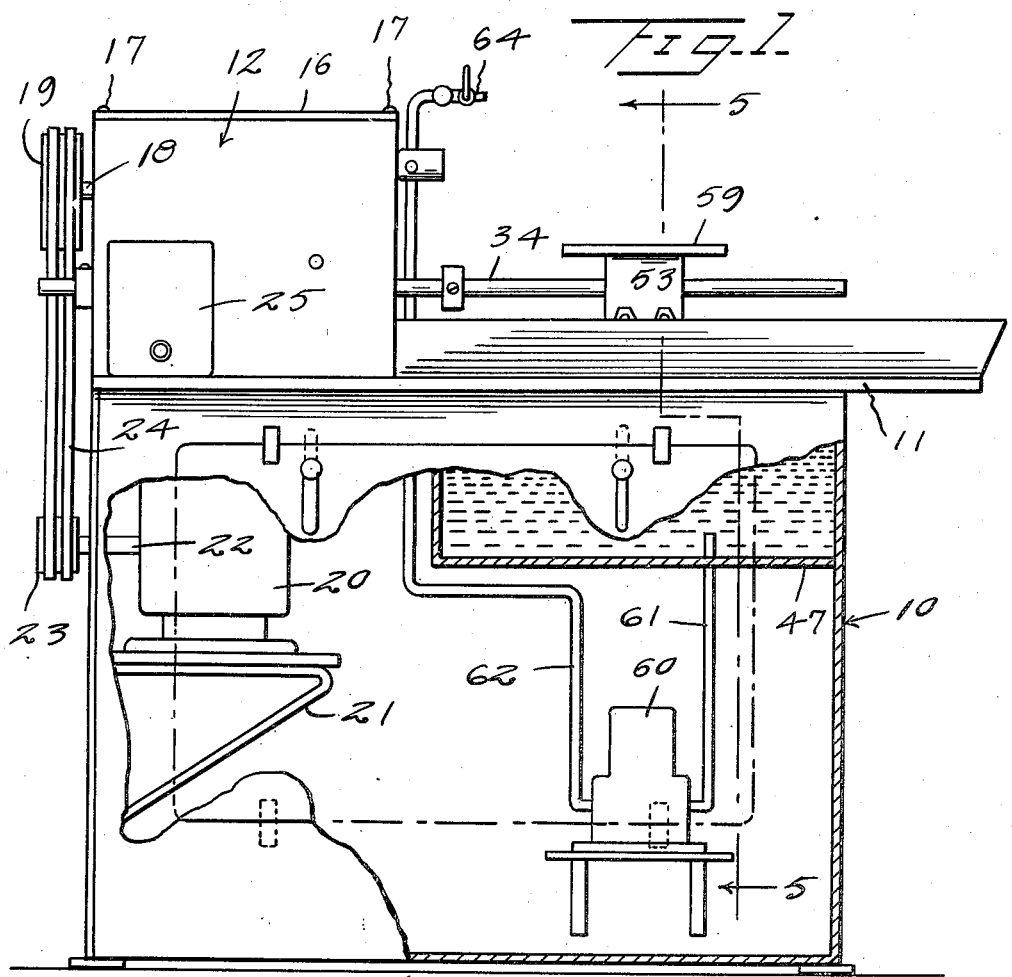
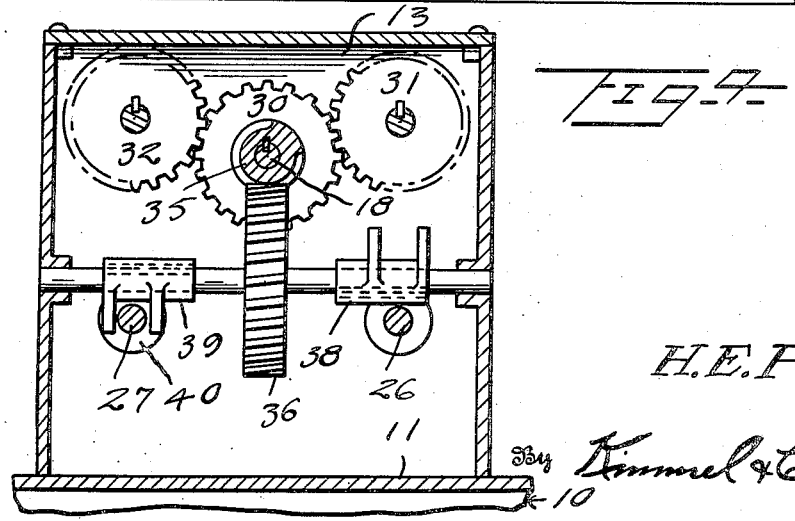
Inventor
H. E. Pruitt
By Kimmel & Crowell
Attorneys

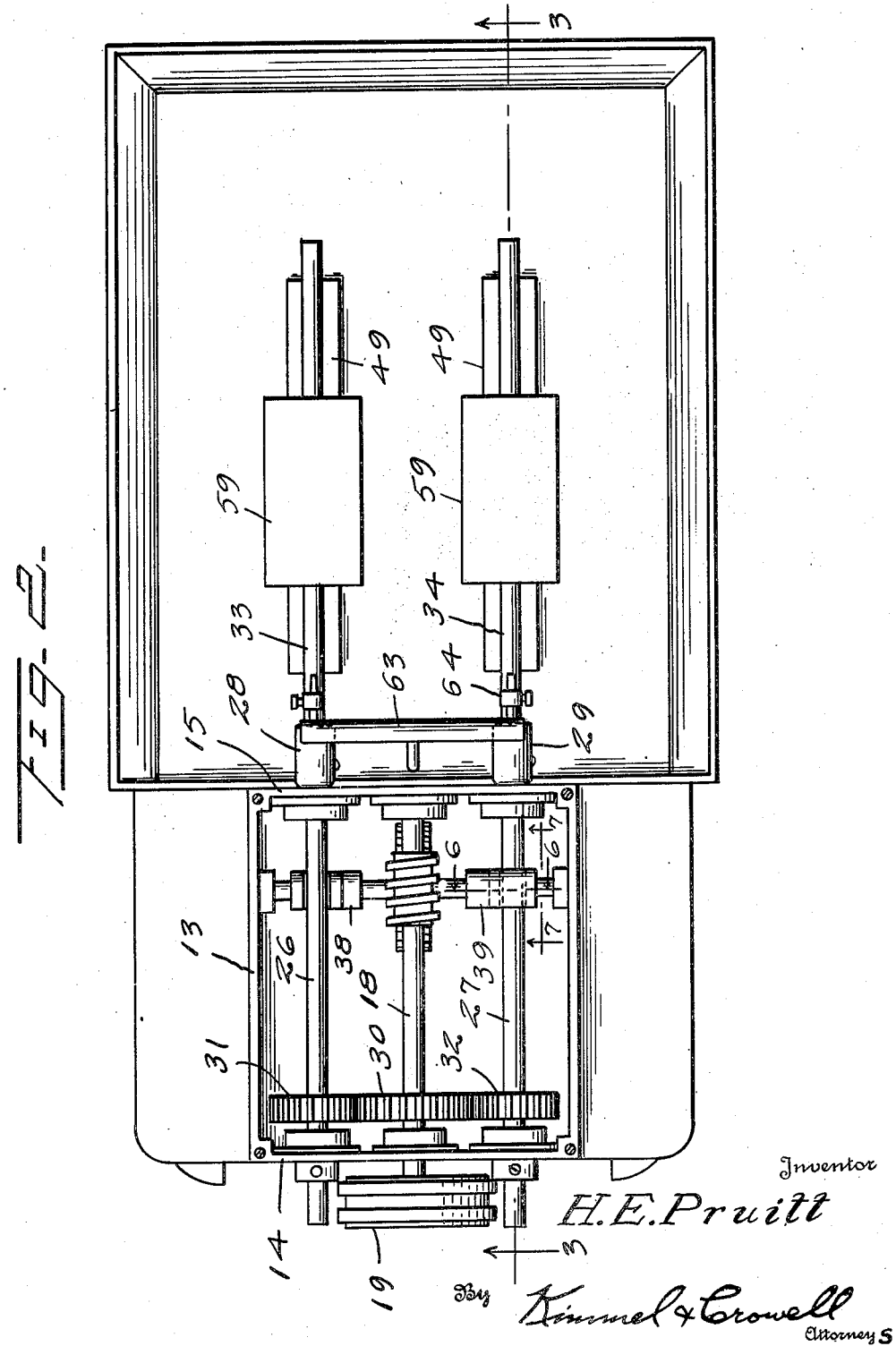

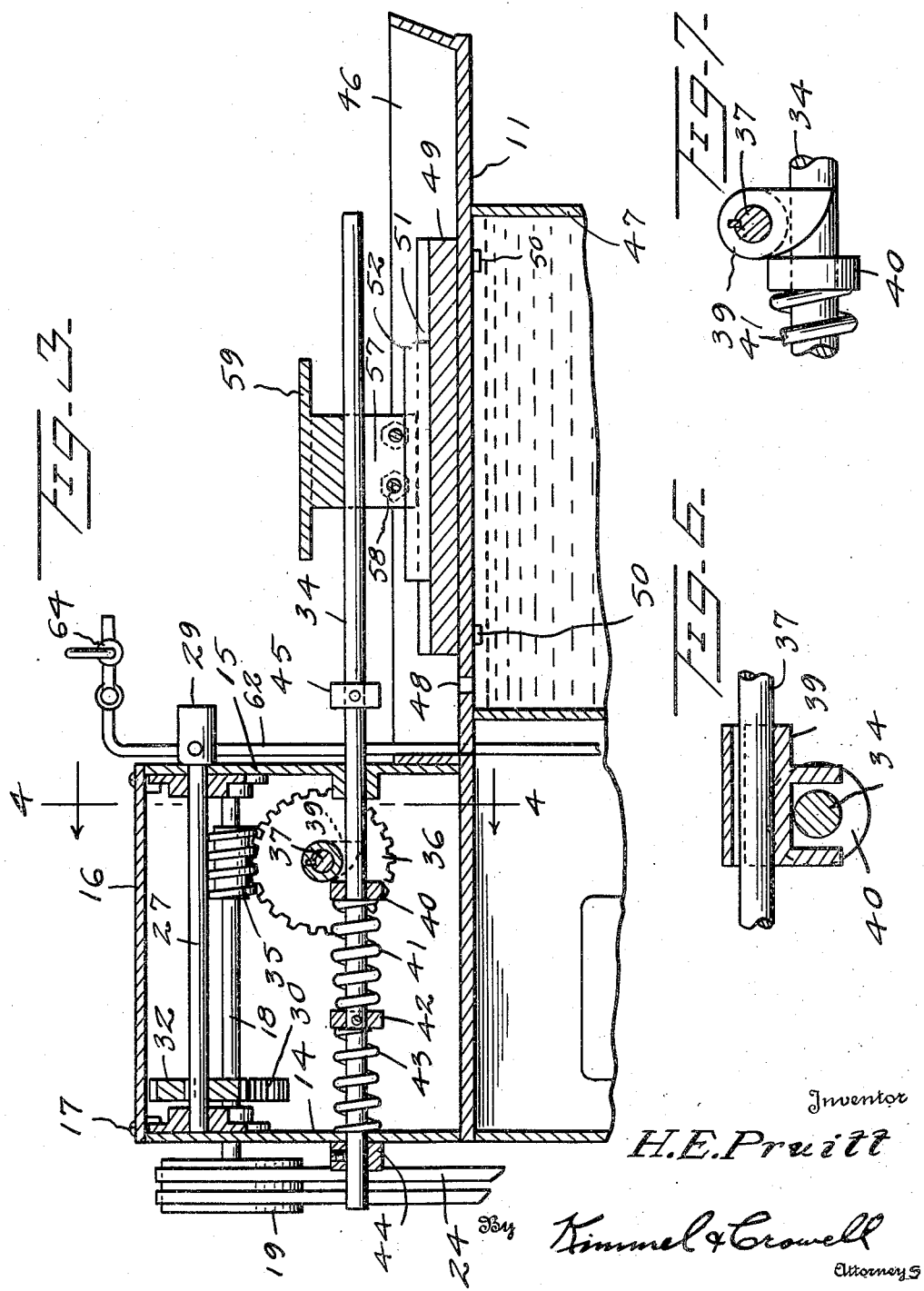

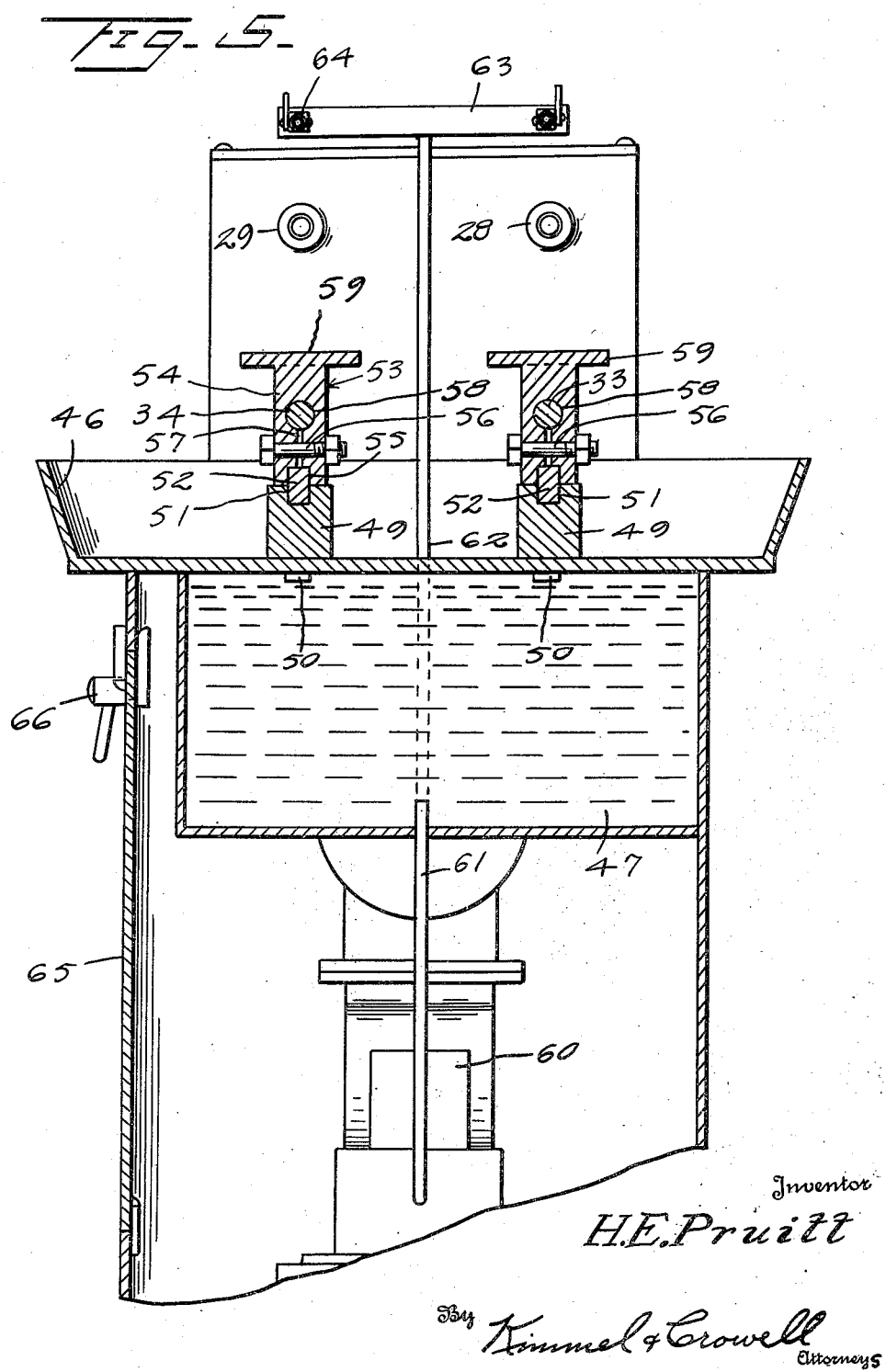

Patented July 24, 1951

2,561,992

UNITED STATES PATENT OFFICE 2,561,992

THREADING, DRILLING, AND REAMING MACHINE

Harvey E. Pruitt, Cheboygan, Mich.

Application May 17, 1948, Serial No. 27,515

3 Claims. (Cl. 10—105)

This invention relates to screw threading machines and is an improvement over the threading machine embodied in my prior patent, No. 1,691,825, issued November 13, 1928, for Nut Tapping Machine.

An object of this invention is to provide a threading machine wherein either internal or external threads may be formed on the work.

Another object of this invention is to provide a threading machine of this kind embodying the use of at least two threading spindles with a work carriage for each spindle and means for alternately moving the carriages so that while one piece of work is being threaded the other carriage may be loaded with a new work piece. In this manner the machine is capable of being operated continuously so that the threading operation may be rapidly performed on the production basis.

A further object of this invention is to provide a threading machine of this kind which is so constructed and arranged that different types of threads may be cut without change in the machine. In the embodiment of this invention shown in the drawings each carriage is moved forward under the action of a feeding cam which bears against a spring-pressed collar correlated with the carriage so that when the die or tap takes hold on the work the latter will be moved under the combined action of the feeding cam and the threading operation with the end thrust on the spindle and die or tap being substantially counterbalanced by the spring-tensioned feeding of the work.

A further object of this invention is to provide a machine of this kind which may be used for threading, drilling or reaming, the character of the operation depending upon the kind of tool secured to the chuck or spindle head.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation, partly broken away and in section, of a machine constructed according to an embodiment of this invention.

Figure 2 is a plan view of the device with the top of the headstock removed.

Figure 3 is a fragmentary vertical section through the upper portion of the device.

Figure 4 is a fragmentary sectional view taken on the line 4—4 of Figure 3.

Figure 5 is a fragmentary sectional view taken on the line 5—5 of Figure 1.

Figure 6 is a fragmentary section view taken on the line 6—6 of Figure 2.

Figure 7 is a fragmentary sectional view taken on the line 7—7 of Figure 2.

Referring to the drawings, the numeral 10 designates generally a hollow base or bed having a top wall 11 disposed in horizontal position. The base 10 has mounted on the top wall 11 thereof a headstock, generally designated as 12 and the headstock 12 includes a housing formed of upright side walls 13 and upright end walls 14 and 15. A cover or closure 16 is secured by fastening devices 17 on the upper edges of the upright walls 13, 14 and 15. A drive shaft 18 is journalled through the walls 14 and 15 of the housing or headstock 12 projecting through the rear wall 14 and a pulley 19 is secured to the rear end of the shaft 18.

A motor or power member 20 is mounted in the base 10 being constructed in the form of an electric motor which is mounted on a bracket or supporting means 21. The motor 20 includes a shaft 22 on which a pulley 23 is secured and a pair of belts 24 are trained about the two pulleys 19 and 23. A switch 25 is secured to the headstock housing 12 and is connected with the motor 20. The housing 12 has journalled therethrough a pair of spindle shafts 26 and 27 which have secured to their forward ends chucks or tool securing members 28 and 29, respectively. The drive shaft 18 has secured thereto a gear 30 and the shafts 26 and 27 have secured thereto gears 31 and 32, respectively, which mesh with the gear 30.

The shafts 26 and 27 are disposed in spaced apart parallel relation and it will be understood that each chuck or tool carrier may have secured thereto an internally threading tool such as a tap, an externally threading tool such as a die, with the taps and dies of conventional construction and of such construction that they will embody retractable cutting teeth so that the shafts 26 and 27 will not have to be reversed in rotation after the desired length of thread has been cut. It will also be understood that the chucks or tool carriers 28 and 29 may have mounted therein drills, reamers or other suitable rotary cutting tools.

There are disposed below the shafts 26 and 27 pull rods 33 and 34 which are slidable through the walls 14 and 15 of the headstock housing 12 and the rods 33 and 34 are adapted to be reciprocated lengthwise of the bed or top wall 11 by means of a worm 35 which is fixed to the drive shaft 18. The worm 35 meshes with a worm gear 36 which is fixed to a transversely extending cam shaft 37 journalled between the side walls 13 of the headstock 12. The cam shaft 37 has fixed thereto a pair of oppositely disposed cam members 38 and 39 associated with the spindles 26 and 27, respectively.

The cam members 38 and 39 are oppositely disposed so that the carriage pull rods 33 and 34 will be alternately moved in the direction of the headstock 12. Each pull rod has mounted thereon, as shown in Figure 3, a sliding or floating collar 40 against which a spring 41 bears and the spring 41 at its rear end bears against a collar 42 which is secured to or fixed on the rod 34. A second spring 43, preferably lesser in strength than that of spring 41 to compensate for the resistance developed at the workpiece during engagement therewith with the tap or die, is disposed about the rod 34 bearing at its forward end against the rear side of collar 42 and bearing at its rear end against the rear wall 14 to return the rod to an outwardly extended position pushing the carrier 59 to its loading position, as shown in Figure 3, on completion of the work cycle. A rear stop collar 44 is adjustably secured on the rear portion of the pull rod 34 and is adapted to limit the forward sliding movement of this rod whereas a second or forward collar 45 is adjustably fixed on the pull rod 34 forwardly of the front wall 15 and is adapted to limit the rearward sliding movement of pull rod 34. The two rods 33 and 34 extend in upwardly spaced parallel relation to the top wall 11 and the latter is formed after the manner of a tray forwardly of the headstock 12 by means of upwardly extending flanges 46 which may be formed integral with the wall 11. The spring 41 is stronger than the spring 43 so that collar 40 and spring 41 act as an overload safety device, and the members 40 and 41 cooperate with the spring 43 and fixed collar 42 to provide a resilient work table feed. If the spring 41 were weaker than the spring 43 the device would not function since the weaker spring 41 would merely compress as a result of being unable to move the collar 42 against the force of a stronger spring 43. Further, if the springs 41 and 43 were of the same strength the operation of the device would be unpredictable and undependable.

A collector or sump 47 is disposed below the top wall 11 and the latter is formed with an opening 48 so that the cutting fluid discharged into the tray formed by the flanges 46 will drain into the sump 47. The wall 11 has secured to the upper side thereof a pair of lengthwise extending guides 49 which in the present instance are secured to the wall 11 by fastening devices 50. Each guide member 49 is formed with a lengthwise extending and upwardly opening groove 51 within which an elongated key 52 slidably engages. The key 52 is adjustably secured to a carriage, generally designated at 53. The carriage 53 includes an upright 54 which is formed with a groove 55 within which a portion of the key 52 is adapted to engage and the key 52 is clamped in the slot or groove 55 by means of a pair of clamping bolts 56. The upright 54 is preferably slotted as indicated at 57 so that the lower portion thereof may be contracted a slight degree sufficient to adjustably clamp the key 52 in the groove 55.

The upright 54 is also formed with a horizontal opening 58 which communicates with the slot 57 so that when the clamping bolts 56 are tight, the pull rod 34 will also be tightly clamped to the upright 54. The upright 54 at its upper end has secured thereto a work carrier table or plate 59 on which the work is adapted to be secured to that the work may be engaged by the tool mounted in the spindle chuck as the carriage is moved toward the chuck.

The base 10 has mounted therein a pump 60 which may be operated by any suitable power device and the intake side of the pump 60 is connected by means of a pipe 61 to the sump or collector 47. The outlet or pressure side of the pump 60 is connected by means of a pipe 62 to a manifold 63 and the latter has extending therefrom a pair of valved nozzles 64 which overlie the pull rods 33 and 34. The base 10 has closure plate 65 on the forward wall thereof which is removably secured by means of latch members 66.

In the use and operation of this device the work is secured on the work tables or carriers 59 and the desired tool such as a die, tap, drill, reamer or the like is mounted one in each of the chucks, 28 and 29. When the motor 20 is operated drive shaft 18 will rotate thereby turning cam shaft 37 clockwise as viewed in Figure 3. Carriage pull rod 34 will initially be pulled forwardly toward the headstock 12, cam 39 moving collar 40 rearwardly and compressing spring 41 as it overcomes the resistance to the movement of rod 34 developed at the workpiece carried by table 59 as it is engaged by the tap or die during the work cycle. It will of course be understood that where a tap or die is mounted in a spindle chuck this tap or die will be of the bit retracting type so that when the desired length of thread has been cut the bits will be retracted and at this time springs 41 and 43 will move pull rod 34 to the right so as to disengage the work from the tool. The use of the springs 41 and 43 will provide a cushioning means for the feeding of the carriage so that this carriage will not be moved forwardly toward the headstock entirely by the threading action of the die or tap which is engaged with the work. By having the cam members 38 and 39 oppositely disposed one carriage will be moved forward while at the same time the other carriage will be moved rearwardly to a work removing and loading position. In this manner the work performed by the machine will be substantially continuous as there will be one piece of work engaged with the tool continuously. It will be understood that there may be two or more of these spindles or, if desired, only one spindle may be used. With two or more spindles the work may be operated upon on a production basis and the character of the work performed will be accurate.

I claim:

1. A machine tool comprising a base, a headstock carried by said base, a spindle rotatably carried by said headstock, drive means rotating said spindle, a work carriage, means supporting said carriage for movement relative to said spindle, a pull rod fixed to said carriage and slidably engaging through said headstock, a collar fixed on said rod, a spring about said rod bearing at one end against said fixed collar, a second collar slidable on said rod, and engaging against the opposite end of said spring, cam means connected with said rotating means engaging said slidable collar for moving the latter against said first mentioned spring to yieldably move said carriage toward said spindle and a second spring about said rod engaging between said fixed collar and a fixed portion of said headstock to constantly urge said rod to an extended position so as to move said carriage away from said spindle on completion of a work cycle, the spring behind the floating collar being stronger than the spring behind the fixed collar.

2. A machine tool comprising a base, a head stock carried by said base, a spindle rotatably carried by said head stock, a work carriage slidably carried by said base for movement toward or away from said head stock, a pull rod slidably engaging through said head stock, means adjustably securing said carriage lengthwise of said pull rod, a collar fixed on said rod within said head stock, a spring about said rod between said collar and the rear end of said head stock constantly urging said rod and carriage away from said head stock, a second collar slidable on said rod within said head stock, a second spring between said first and second collars, a cam operatively coupled with said spindle for rotation thereby and bearing against said second collar, partial rotation of said cam effecting compression of said springs and tensioned movement of said carriage toward said spindle, and further rotation of said cam releasing said second collar and springs whereby the latter may move said carriage away from said head stock, the spring behind the floating collar being stronger than the spring behind the fixed collar.

3. A machine tool comprising a base, a headstock carried by said base having a fixed wall, a spindle rotatably carried by said headstock, drive means rotating said spindle, a work carriage, means supporting said carriage for movement relative to said spindle, a pull rod fixed to said carriage and slidably engaging through said headstock, a collar fixed on said rod at a point disposed from said fixed wall, a spring about said rod bearing at one end against said collar with the other end engaging said fixed wall and adapted to constantly urge said rod to a retracted position, a second collar slidable on said rod and disposed between said fixed collar and said carriage, a second spring about said rod engaging between said first collar and said second slidable collar, means connected with said rotating means engaging said second collar for moving the latter and thereby compressing said second spring whereby to yieldably move said carriage toward said spindle, said latter named means including a rotatable cam so arranged and constructed as to compress said springs during a portion of the revolution thereof, and to release said springs during the remainder of each revolution thereof for return of said carriage to inoperative and loading position, said first mentioned spring being of lesser strength than the second mentioned spring for cooperative operation of both springs to effect substantially equal response to movement of the cam under conditions of varying resistance developed at a workpiece carried by the carriage.

HARVEY E. PRUITT.

REFERENCES CITED

The following references are of record in the file of this patent:

UNITED STATES PATENTS

| Number | Name | Date |
| --- | --- | --- |
| 402,759 | Miller | May 7, 1889 |
| 691,199 | Stephans | Jan. 14, 1902 |
| 698,828 | Ferry | Apr. 29, 1902 |
| 738,989 | Dicke | Sept. 15, 1903 |
| 1,068,126 | Hamilton | July 22, 1913 |
| 1,446,557 | Godfriaux | Feb. 27, 1923 |
| 1,460,088 | Wilson | June 26, 1923 |
| 1,691,825 | Pruitt | Nov. 13, 1928 |
| 1,847,979 | Pruitt | Mar. 1, 1932 |
| 2,189,152 | Procunier | Feb. 6, 1940 |